United States Patent [19]

Brooks

[11] 4,315,361
[45] Feb. 16, 1982

[54] METHOD OF REINFORCING A DUCT

[75] Inventor: Ray G. Brooks, Irving, Tex.

[73] Assignee: Malco Products, Inc., Annandale, Minn.

[21] Appl. No.: 164,764

[22] Filed: Jun. 30, 1980

Related U.S. Application Data

[62] Division of Ser. No. 1,177, Jan. 5, 1979, Pat. No. 4,237,940.

[51] Int. Cl.³ ............................................. B23P 11/00
[52] U.S. Cl. ....................................... 29/432.1; 29/509
[58] Field of Search ...................... 29/432.1, 432, 509, 29/522 R; 138/98, 99, 153, 172

[56] References Cited

U.S. PATENT DOCUMENTS

| 1,285,210 | 11/1918 | Jones | 138/99 X |
|---|---|---|---|
| 1,951,839 | 3/1934 | Rivers | 29/522 R UX |
| 2,095,714 | 12/1937 | Pinaud et al. | 29/522 R UX |
| 2,171,388 | 8/1939 | Berger | 29/432.1 |
| 2,224,918 | 12/1940 | Merrill | 138/99 |
| 3,344,370 | 9/1967 | Sewell | 29/509 UX |
| 3,345,733 | 10/1967 | Weaver | 29/509 X |
| 3,867,968 | 2/1975 | Ritter et al. | 29/509 X |
| 3,903,582 | 9/1975 | Sweeney | 29/509 X |
| 4,090,709 | 5/1978 | Fujii | 29/509 X |

Primary Examiner—Charlie T. Moon
Attorney, Agent, or Firm—Kanz & Timmons

[57] ABSTRACT

A duct reinforcement and a method for building the reinforcement including a special tool for use in a preferred method are disclosed. The duct reinforcement icludes a support washer on each of two opposing sides of the duct to be supported and a stiff wire extending through the sides of the ducts and both washers. The portion of the wire protruding beyond each support washer on the outside of the duct forms a hook with a tip of the wire substantially opposed to the outer face of the respective support washer. A preferred form of the support washer forms a volcano-shaped contour surrounding the washer hole on the outer face so that the tip of the wire makes contact with the washer inside the crest of the volcano-shaped contour. A preferred arrangement includes a rubbery seal between each support washer and the respective side of the duct to prevent leakage from the duct. A preferred method for reinforcing a duct includes bending one end of a wire into a hook, placing a support washer against one side of the duct, inserting the non-hooked end of the wire through the support washer and both sides of the duct until the tip of the hooked end of the wire substantially opposes the outer face of the support washer, placing a second support washer over the still straight end of the wire, cutting the still straight end of the wire to a length suitable for hooking and bending it into a hook with the tip substantially opposed to its respective support washer. A specially designed tool aids in measuring, cutting, and bending the wire.

4 Claims, 12 Drawing Figures

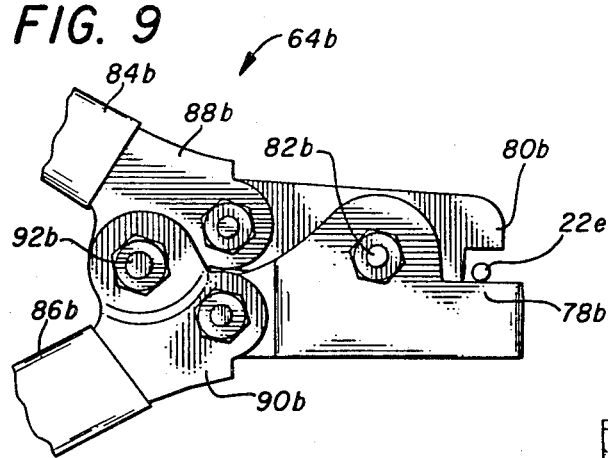
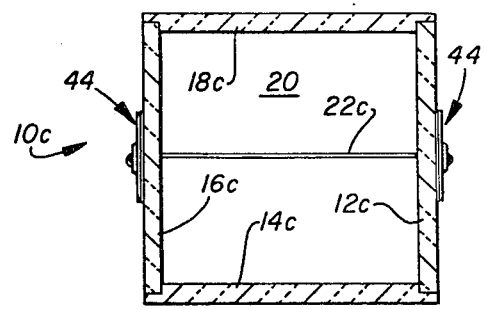
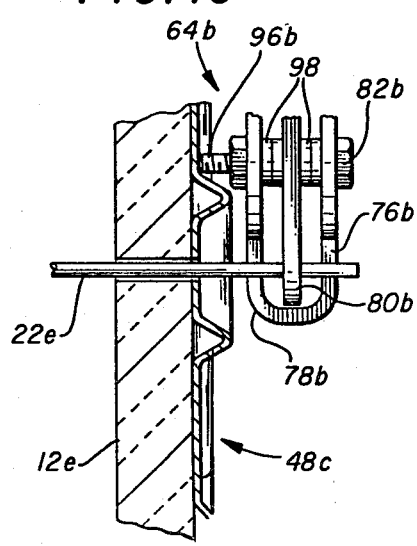
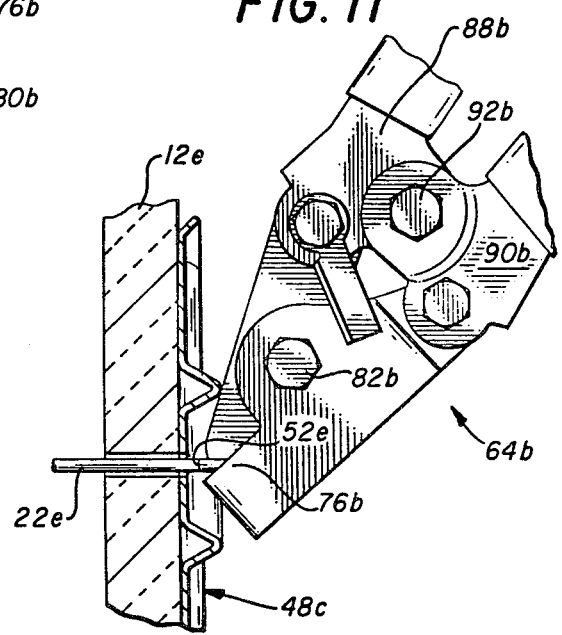

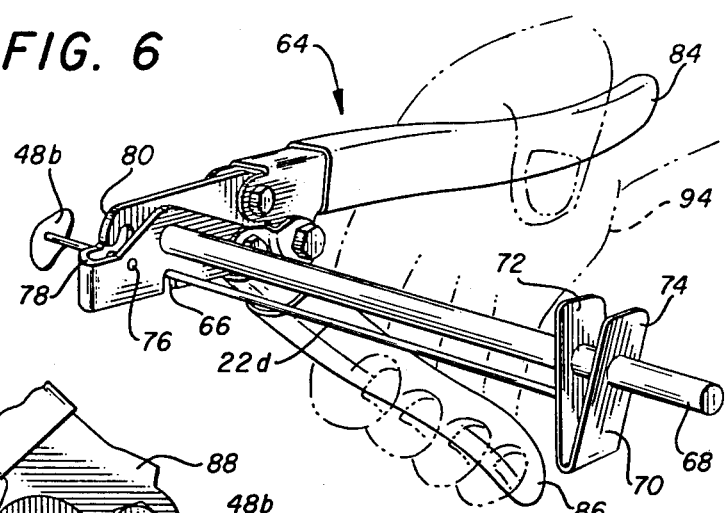
FIG. 6
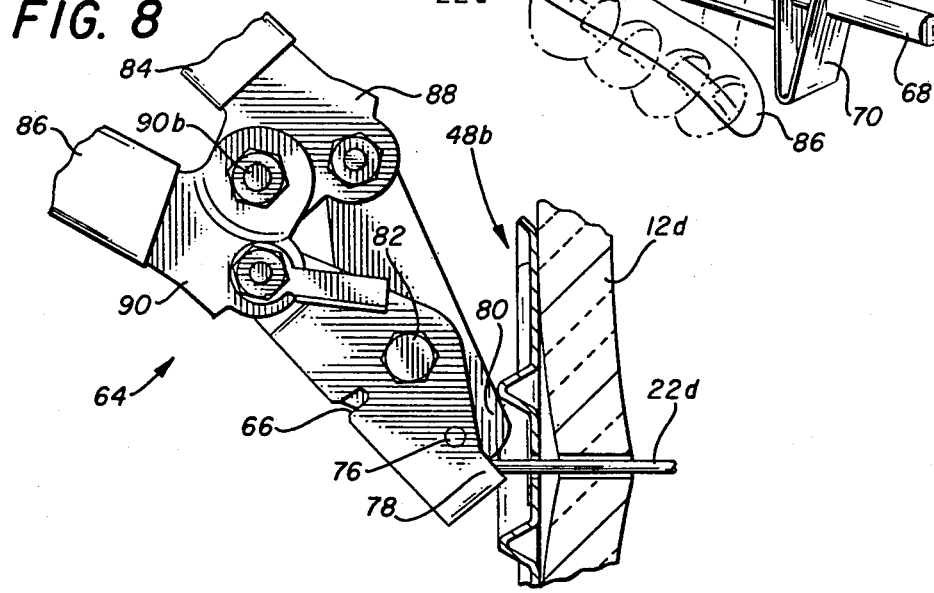
FIG. 8
FIG. 7
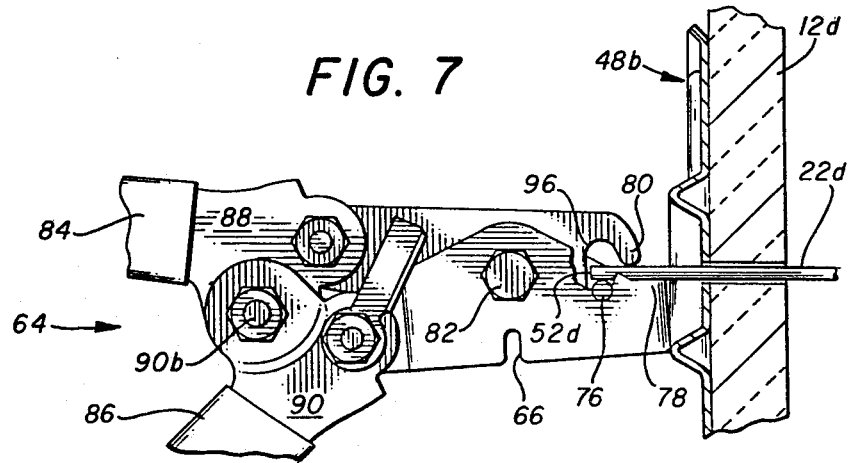

METHOD OF REINFORCING A DUCT

This is a division of application Ser. No. 1,177, filed Jan. 5, 1979, now U.S. Pat. No. 4,237,940, issued Dec. 9, 1980.

BACKGROUND OF THE INVENTION

1. Field of the Invention

The present invention relates generally to reinforcement of ducts such as fibrous glass ducts, and in one of its aspects, to a method and apparatus for terminating tie rod reinforcing wire to reinforce a duct.

2. Description of the Prior Art

Ducts, especially air ducts for air conditioning and heating systems, are frequently constructed of structurally weak material such as fiberglass covered with metallic foil. Structural support is provided to such ducts by passing a tie rod reinforcing wire through two opposing sides of a duct and terminating the ends of the wire on the outsides of the duct in a way that prevents the wire from being pulled back through the duct. To prevent tearing of the duct by the terminations of the tie rod reinforcing wire, it has become common practice to use a support washer on the outside of the duct on each of the two opposing sides and to extend the wire through both support washers so that the wire termination exerts force against the washers rather than the sides of the duct. A conventional support washer is constructed of sheet metal with some ribbing to give it additional structural strength.

A commonly used termination for tie rod reinforcing wires makes use of what is known as "the double bend method". The double bend method involves bending the portion of wire protruding beyond the outside of each support washer approximately 90° so that the wire makes contact with the support washer and then making an approximately 180° bend in the wire roughly an inch or two beyond the original bend. Many attempts have been made to improve on the double bend method of tie rod reinforcing wire termination. One method of terminating a tie rod reinforcing wire which is currently in practice involves the use of an internal pop rivet sleeve which is placed over the tie rod reinforcing wire with the head of the rivet facing away from the duct. The pop rivet is slipped through the support washer until its head rests on the washer. The support washer and side of the duct are then pressed in slightly so that a crimping tool can be used to crimp the sleeve into the wire, thus completing the termination. An alternative method is known as the "external pop rivet sleeve" method and is similar to the internal pop rivet sleeve method except the sleeve is slipped over the wire with the head of the sleeve facing the duct so that the sleeve remains outside the duct. The sleeve is more easily crimped using the external pop rivet sleeve method, but this method leaves a significant protrusion on the outside of the duct which can be bumped into, tearing clothing and skin or damaging the duct.

One other method of terminating tie rod reinforcing wire for ducts is the use of a cap washer. A cap washer has a spring steel or stainless steel locking insert for holding a wire. A wire is cut so that a short protrusion remains on the outside of each support washer. A cap washer is then pushed onto each end of the wire.

The original double bend method is somewhat awkward to perform and leaves a protruding wire. The double bend method also has the tendency to unbend during high pressure conditions. The pop rivet sleeve methods require a pop rivet sleeve in addition to the support washers. Furthermore, the crimp connections are often poorly made and have relatively poor tensile strength. Crimping the sleeve using the internal pop rivet sleeve method is difficult and requires the person installing the reinforcement to depress the washer into the duct wall. The external pop rivet sleeve method leaves a significant protrusion on the outside of the duct walls. The cap washer method requires a cap washer and is relatively expensive when compared to the other methods.

SUMMARY OF THE INVENTION

The present invention concerns a method and apparatus for reinforcing a duct which utilizes two support washers and a stiff wire extending through the sides of the duct and through both support washers. As in the prior art, one support washer is on each of two opposing sides of the duct so that the two support washers are substantially aligned with each other, with the outer face of each support washer facing away from the duct. In the present invention, the wire protruding beyond each support washer on the outside of the duct forms a hook with the tip of the wire substantially opposed to the outer face of the respective support washer.

In a duct reinforcement according to the present invention, each support washer forms a volcano-shaped contour surrounding the washer hole on the outer face. The distance between the edge of the washer hole and the crest of the volcano-shaped contour is greater than the distance between the tip of the wire and the shank of the wire so that the volcano-shaped contour resists a bending outward of the hook. In a preferred arrangement, a rubbery seal is associated with each support washer between the support washer and the respective side of the duct. The wire pierces each seal, and each seal clings to the wire thereby sealing the holes for the wire in the sides of the duct.

A method for reinforcing a duct according to the present invention includes bending one end of a substantially straight stiff wire to form a hook, placing a support washer against one side of the duct so that an outer face of the support washer faces away from the duct, inserting the substantially straight end of the wire through the support washer, the adjacent side of the duct and the opposite side of the duct until the tip of the hooked end of the wire substantially opposes the outer face of the support washer, placing a second support washer over the substantially straight end of the wire against the side of the duct so that an outer face of the second support washer faces away from the duct, cutting the portion of the wire protruding beyond the second support washer to a predetermined length, and bending the portion of wire protruding beyond the second support washer to form a hook with the tip of the portion of the wire protruding beyond the second support washer substantially opposed to the second support washer.

A special tool according to the present invention aids in measuring and cutting the wire as well as bending the wire to form a hook. The tool includes means for cutting wire, a shaft affixed to the tool extending substantially parallel to a straight wire positioned for being cut, and a slidably adjustable stop mounted on the shaft extending into the longitudinal projection of a straight wire positioned for being cut. In order to cut a portion of wire protruding beyond the second support washer to a predetermined length, an installer adjusts the stop on the shaft to where the distance from the means for cutting wire to the stop equals the length of wire protruding beyond the second support washer minus the predetermined length. The installer then positions the tool for cutting the wire with the shaft extending away from the duct and the tip of the wire abutting the stop, and then cuts the wire.

The tool also has two spaced apart outer bending members and an inner bending member movable between a first position which allows a substantially straight wire of not greater than a predetermined maximum diameter to be placed between the inner bending member and the proximal surfaces of the two outer bending members, and a second position interposed between the two outer bending members with the distance between the inner bending member and each outer bending member at least as great as the predetermined maximum diameter. Bending the portion of the wire protruding beyond the second support washer to form a hook using the tool includes, in sequence, moving the inner bending member to the first position, placing the wire between the inner bending member and the proximal surfaces of the outer bending members, positioning the tool with respect to the wire being formed into a hook so that the tip of the wire touches the support washer when the hook is formed, and moving the inner bending member to the second position.

These and other objects, advantages and features of this invention will be apparent from the following description taken with reference to the accompanying drawings, wherein is shown the preferred embodiments of the invention.

BRIEF DESCRIPTION OF THE DRAWING

FIG. 5a is a cross-sectional view similar to FIG. 1 of a duct and duct reinforcement according to the present invention.

FIG. 6 is a perspective view of a tool according to the present invention being used to cut a wire to a predetermined length;

FIG. 7 is a side elevational view of a tool according to the present invention positioned for terminating a tie rod reinforcing wire;

FIG. 8 is a side view of the tool of FIG. 7 completing a tie rod reinforcing wire termination;

FIG. 9 is a side elevational view of an alternative embodiment of a tool according to the present invention;

FIG. 10 is a top view of the tool of FIG. 9 positioned for terminating a tie rod reinforcement; and FIG. 11 is a side view of the tool of FIGS. 9 and 10 completing a termination of a tie rod reinforcement.

DETAILED DESCRIPTION

1. Prior Art

Figure 1:
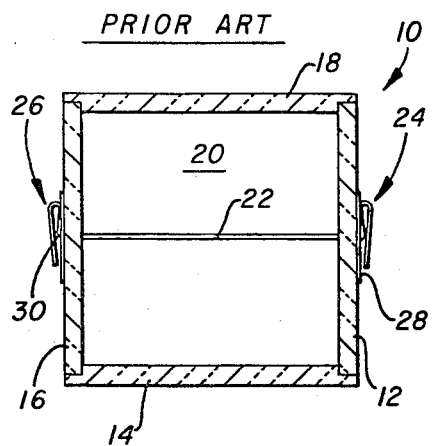
FIG. 1 is a cross-sectional view of a duct and a duct reinforcement according to the prior art.

Referring to the drawings, a duct such as an air conditioner duct is referred to generally by reference numeral 10. Duct 10 includes fiberglass walls 12, 14, 16, and 18 which form a channel 20 for the passage of air. A conventional way of reinforcing a duct such as duct 10 is by using a tie rod reinforcing wire 22 which is a stiff wire, typically 12-gauge wire, which is terminated on the outside of two opposing sides 12 and 16. Terminations 24 and 26 on sides 12 and 16 respectively exert pressure on sides 12 and 16 sufficient to rigidify duct 10. Terminations such as terminations 24 and 26 have frequently included support washers 28 and 30 respectively so that any force exerted by wire 22 against sides 12 and 16 of duct 10 will be spread over a larger area and prevent tearing the typically thin surfaces of the metallic foil covered fiberglass sides. Typically, such washers are 2.5 inches on each side.

Figure 2:
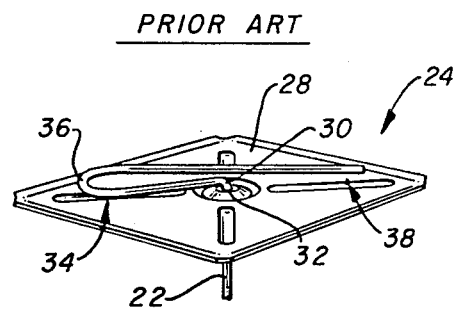
FIG. 2 is a detailed view of a tie rod termination using the double bend method according to the prior art.

A commonly used termination 24 makes use of the double bend method which includes a substantially 90° bend 30, referring to FIG. 2, in wire 22 near where wire 22 exits washer hole 32 so that wire 24 makes contact with support washer 28 at point 34. An approximately 180° bend 36 is made in wire 22 roughly an inch away from 90° bend 30 so that wire 22 bends back over itself to make contact or nearly to make contact with support washer 28 at point 38. As internal air pressure in channel 20 exerts pressure against the sides of duct 10, side 12 exerts pressure against washer 28 which in turn exerts pressure at points 34 and 38 against wire 22. The pressure exerted by washer 28 at point 34 tends to unbend 90° bend 30 and pressure at point 38 by washer 28 tends to unbend 180° bend 36. During over pressure conditions, the double bend tends to relax, weakening the duct structure. Additionally, the double bend method is difficult to perform.

Figure 3:
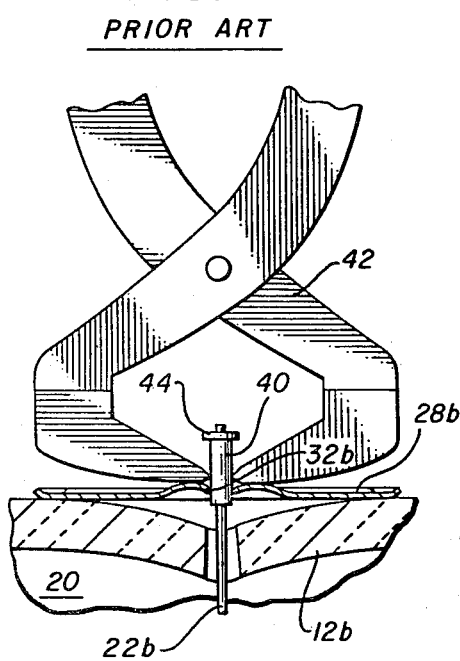
FIG. 3 is a cross-sectional detailed view of one step in the method of terminating a tie rod according to the internal pip rivet sleeve method of the prior art.
Figure 4:
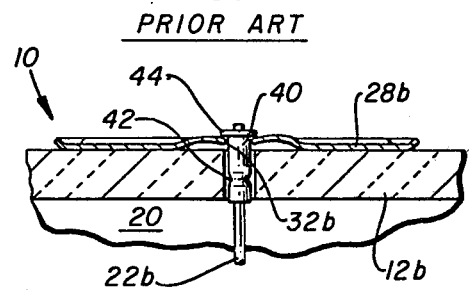
FIG. 4 is a cross-sectional detailed view of an internal pop rivet sleeve tie rod termination according to the prior art.

Referring now to FIGS. 3 and 4, another termination for tie rod reinforcing wire 22b currently in use includes a pop rivet sleeve 40 which is attached to the end of wire 22b by means of a crimping tool 42. In order to make a crimp in internal pip rivet sleeve 40, side 12b must be shoved in and support washer 28b shoved in toward channel 20 so that crimping tool 42 has access to the sleeve portion of pop rivet sleeve 40 for making a crimp 42 as shown in FIG. 4. Head 44 of pop rivet sleeve 40 is larger than washer hole 32b so that outward pressure in channel 20 is resisted by the force of head 44 on support washer 28b. Attaching rivet 40 using the internal pop rivet sleeve method is difficult, and the terminations made are often unreliable. Using a longer protrusion of wire 22b beyond the outside of duct 10 and support washer 28b, and reversing pop sleeve rivet 40 so that head 44 faces duct 10 leads to the external pop sleeve method which is easier to install, but leaves a significant protrusion on the outside of the duct.

2. Present Invention

Figure 5:
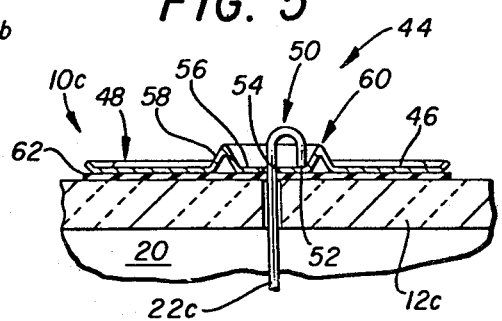
FIG. 5 is a cross-sectional detailed view of a tie rod termination in accordance with the present invention.

Referring now to FIG. 5, a termination 44 for a duct tie rod reinforcing wire according to the present invention includes a support washer 46 placed on the outside of duct 10 over tie rod reinforcing wire 22c with outer face 48 of support washer 46 facing away from duct 10. The portion of tie rod reinforcing wire protruding beyond support washer 46 on the outside of duct 10 forms a hook 50 with tip 52 of tie rod reinforcing wire 22c substantially opposed to outer face 48 of support washer 46.

A preferred form of support washer 46 forms a washer hole 54 for wire 22c, and outer face 48 forms a substantially planar area 56 surrounding washer hole 54 and a significantly raised area 58 surrounding substantially planar area 56. The distance between the edge of washer hole 54 and crest 60 of significantly raised area 58 is sufficiently greater than the distance between tip 52 of wire 22c and the shank of wire 22c that significantly raised area 58 resist a bending outward of hook 50. The raised areas in the support washers of the prior art were to provide additional structural strength to the washer and were not significantly raised enough to have independent function such as preventing the unbending of a hook. The shank of wire 22c is generally the relatively straight portion of wire 22c that extends through duct 10. A support washer 46 as described can generally be described as forming a volcano-shaped contour surrounding washer hole 54 on outer face 48. A preferred form of termination 44 in accordance with the present invention also includes a rubbery seal 62 associated with support washer 46 and the respective side 12c of duct 10. Wire 22c pierces seal 62, so that the seal clings to the wire and the hole for the wire in the side of the duct is sealed.

Referring to both FIG. 1 and FIG. 5, a duct reinforcement according to the present invention will normally include two support washers 46 placed on the outside of duct 10, one of the support washers on each of two opposing sides such as sides 12 and 16 of duct 10 so that the two support washers are substantially aligned with each other with the outer face 48 of each support washer facing away from duct 10, and a stiff wire 22c extending through the sides of the duct and through both support washers. The portion of the wire protruding beyond each support washer on the outside of the duct forms a hook 50 with tip 52 of wire 22c substantially opposed to outer face 48 of the respective support washer 46.

A preferred method for reinforcing a duct according to the present invention includes the combination of bending one end of a substantially straight stiff wire to form a hook, placing a support washer against one side of the duct so that an outer face of the support washer faces away from the duct, inserting the substantially straight end of the wire through the support washer, the adjacent side of the duct, and the opposite side of the duct until the tip of the hooked end of the wire substantially opposes the outer face of the support washer, placing a second support washer over the substantially straight end of the wire against the side of the duct so that an outer face of the second suppot washer faces away from the duct, cutting the portion of the wire protruding beyond the second support washer to a predetermined length, and bending the portion of the wire protruding beyond the second support washer to form a hook with the tip of the portion of the wire protruding beyond the second support washer substantially opposed to the second support washer. The order in which a washer is placed against the side of the duct and the wire is inserted through the same washer is arbitrary and order listed is not considered limiting.

Referring now to FIGS. 6, 7, and 8, a tool 64 according to the present invention for practicing a preferred method of the present invention includes means 66 for cutting wire, a shaft 68 affixed to tool 64, extending substantially parallel to a straight wire 22d positioned for being cut, and a slidably adjustable stop 70 mounted on shaft 68. Stop 70 extends into the longitudinal projection of a straight wire such as wire 22d positioned for being cut so that cutting a straight wire positioned for cutting with one tip of the wire abutting stop 70 substantially as shown cuts a length of wire equal to the distance from means 66 for cutting wire to stop 70. A preferred form of stop 70 especially suited for a round shaft 68 consists of a V-shaped spring member which is slidably movable longitudinally on shaft 68 so long as ends 72 and 74 are pressed near each other. When ends 72 and 74 are no longer pressed near each other, V-shaped spring stop 70 exerts its spring action against shaft 68 so that stop 70 will not slide with respect to shaft 68. By using tool 64 for measuring and cutting off a fixed amount of wire 22d, a small inventory of wire lengths can be maintained with one end hooked in the factory. In this way, for a given duct size, a fixed amount of wire will need to be cut off in every case so that stop 70 can be adjusted once for a given duct size and wire length. Once wire 22d is cut using this method, a predetermined length of wire protrudes from surface 48b.

Tool 64 can also be used for forming a stiff wire protruding a predetermined length from a surface into a hook with a tip of the wire substantially opposed to the surface. Tool 64 includes two spaced apart outer bending members 76 and 78, and an inner bending member 80 movable between a first position shown in FIG. 7 which allows a substantially straight wire 22d to be placed between inner bending member 80 and the proximal surfaces of two outer bending members 78 and 76, and a second position substantially as shown in FIG. 8 interposed between two outer bending members 76 and 78. The distance between inner bending member 80 and each outer bending member 76 or 78 remains at least as great as the diameter of wire 22d so that wire 22d is placed between the inner bending member in the first position in the proximal surfaces of the outer bending members and is bent into a hook by moving the inner bending member to the second position. One means for moving inner bending member 80 between the first position and the second position includes a bolt 82 about which inner bending member 80 pivots with respect to outer bending members 76 and 78, handles 84 and 86, and generally L-shaped linkage members 88 and 90. L-shaped linkage member 88 is affixed to handle 84 and pivotally connected to linkage member 90 and inner bending member 80. Similarly, generally L-shaped linkage member 90 is affixed to handle 86 and is pivotally connected to generally L-shaped linkage member 88 and outer bending members 76 and 78. A coil spring wrapped around bolt 92 which pivotally connects generally L-shaped linkage member 88 to generally L-shaped linkage member 90 and operable on handles 84 and 86 can be used to return inner bending member 90 to the first position. A tool substantially as described can be used for cutting wire and bending it to form a hook with a single hand 94 of an installer. Shaft 68 can be screwed directly onto bolt 82 rather than putting a nut on the side of the bolt opposite the head. Outer bending member 76 in this embodiment can be a pin or a screw. Tool 64 also includes a means 96 for positioning tool 64 with respect to surface 48b and wire 22d to be formed into a hook. In this embodiment, means 96 is merely a means for blocking wire 22d so that it is only inserted into the tool a certain distance. The distance is such that when the hook is formed in wire 22d, tip 52d of wire 22d touches surface 48b.

Referring now to FIGS. 9, 10, and 11, an alternative embodiment 64b of tool 64 in accordance with the present invention is constructed so that the tool can be positioned on wire 22e with the tool substantially parallel to side 12e. Parts of tool 64b which correspond to other parts of tool 64 are numbered the same as in tool 64 but include different letter designations. Means 96b for positioning tool 64b in this embodiment is merely the protrusion of bolt 82b beyond the rest of tool 64b. Means 96b makes contact with surface 48c, maintaining the proper distance between inner bending member 80b and surface 48c. Washers 98 are used as spacers to maintain the proper distance between inner bending member 80b and outer bending members 76b and 78b.

A duct reinforcement according to the present invention is thus seen to be easy to install and to require no additional parts such as cap washers or pop rivet sleeves. The only parts required are the wire and support washers although a preferred arrangement also includes rubbery seals. A duct reinforcement according to the present invention exceeds all of the reinforcements of the prior art in its tensile strength after fatiguing.

From the foregoing it will be seen that this invention is one well adapted to attain all of the ends and objects hereinabove set forth, together with other advantages which are obvious and which are inherent to the apparatus. It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method for reinforcing a duct comprising, in combination:
   bending one end of a substantially straight stiff wire to form a hook;
   placing a support washer against one side of the duct so that an outer face of the support washer faces away from the duct;
   inserting the substantially straight end of the wire through the support washer, the adjacent side of the duct, and the opposite side of the duct until the tip of the hooked end of the wire substantially opposes the outer face of the support washer;
   placing a second support washer over the substantially straight end of the wire against the side of the duct so that an outer face of the second support washer faces away from the duct;
   cutting the portion of the wire protruding beyond the second support washer to a predetermined length; and
   bending the portion of the wire protruding beyond the second support washer to form a hook with the tip of the portion of the wire protruding beyond the second support washer substantially opposed to the second support washer.

2. A method for reinforcing a duct according to claim 1 utilizing a tool having means for cutting wire, a shaft affixed to the tool extending substantially parallel to a straight wire positioned for being cut, and a slidably adjustable stop mounted on the shaft extending into the longitudinal projection of a straight wire positioned for being cut, wherein cutting the portion of the wire protruding beyond the second support washer to a predetermined length comprises, in sequential combination:
   adjusting the stop on the shaft to where the distance from the means for cutting wire to the stop equals the length of wire protruding beyond the second support washer minus the predetermined length;
   positioning the tool for cutting the wire with the shaft extending away from the duct and the tip of the wire abutting the stop; and
   cutting the wire.

3. A method for reinforcing a duct according to claim 2 utilizing a tool having two spaced apart outer bending members, and an inner bending member movable between a first position which allows a substantially straight wire of not greater than a predetermined maximum diameter to be placed between the inner bending member and the proximal surfaces of the two outer bending members, and a second position interposed between the two outer bending members with the distance between the inner bending member and each outer bending member at least as great as the predetermined maximum diameter, wherein bending the portion of the wire protruding beyond the second support washer to form a hook comprises in sequential combination:
   moving the inner bending member to the first position;
   placing the wire between the inner bending member and the proximal surfaces of the outer bending members;
   positioning the tool with respect to the wire to be formed into a hook whereby the tip of the wire touches the surface when the hook is formed; and
   moving the inner bending member to the second position.

4. A method for reinforcing a duct according to claim 1 utilizing a tool having two spaced apart outer bending members, an inner bending member movable between a first position which allows a substantially straight wire of not greater than a predetermined maximum diameter to be placed between the inner bending member and the proximal surfaces of the two outer bending members, and a second position interposed between the two outer bending members with the distance between the inner bending member and each outer bending member at least as great as the predetermined maximum diameter, wherein bending the portion of the wire protruding beyond the second support washer to form a hook comprises in sequential combination:
   moving the inner bending member to the first position;
   placing the wire between the inner bending member and the proximal surfaces of the outer bending members;
   positioning the tool with respect to the wire to be formed into a hook whereby the tip of the wire touches the surface when the hook is formed; and
   moving the inner bending member to the second position.

* * * * *